Oct. 14, 1952 E. G. SMITH 2,614,162
CURRENCY DENOMINATION INDICATOR
Filed Feb. 7, 1951 2 SHEETS—SHEET 1
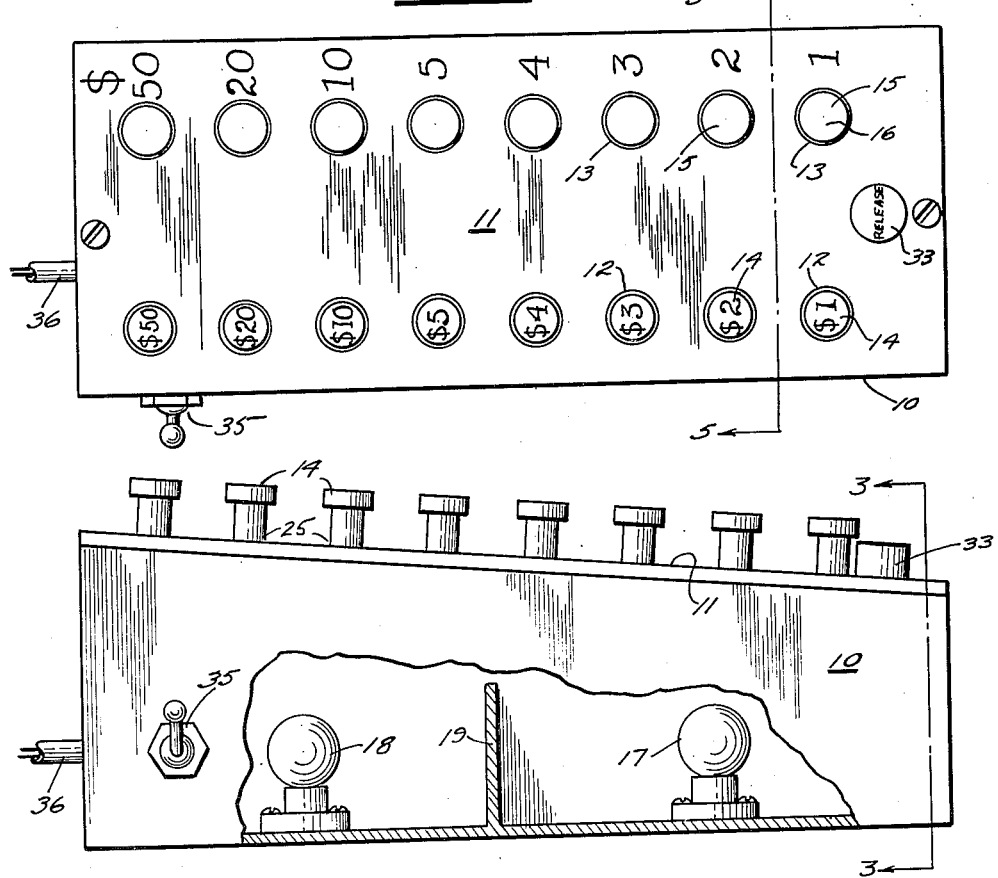
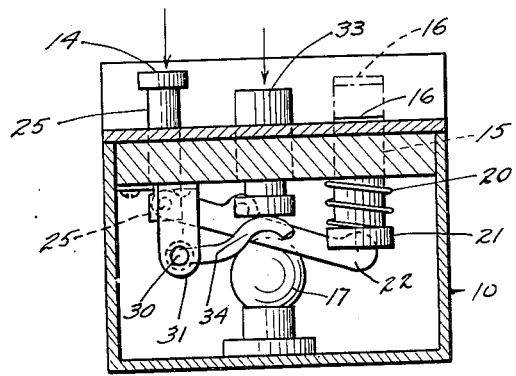
INVENTOR.
Edgar G. Smith.
BY W. B. Harpman
ATTORNEY.

Oct. 14, 1952 — E. G. SMITH — 2,614,162
CURRENCY DENOMINATION INDICATOR
Filed Feb. 7, 1951 — 2 SHEETS—SHEET 2
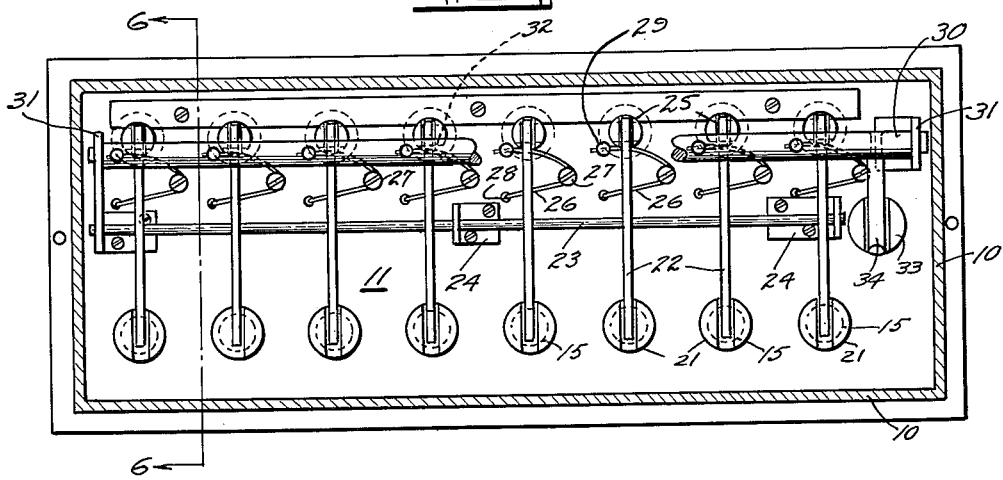
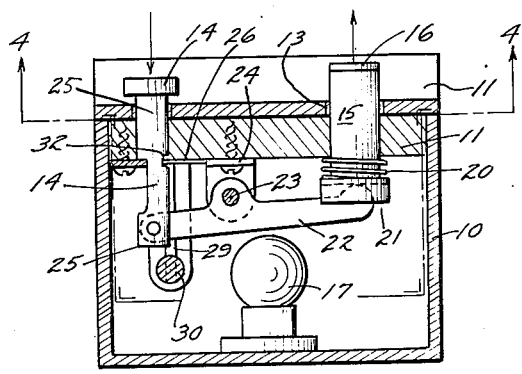
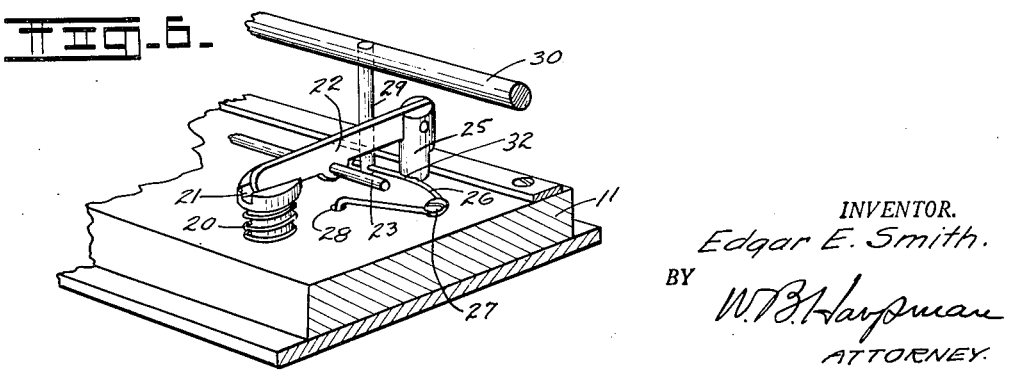
INVENTOR.
Edgar E. Smith.
BY W. B. Harpman
ATTORNEY.

Patented Oct. 14, 1952

2,614,162

UNITED STATES PATENT OFFICE 2,614,162

CURRENCY DENOMINATION INDICATOR

Edgar G. Smith, Youngstown, Ohio

Application February 7, 1951, Serial No. 209,859

6 Claims. (Cl. 177—337)

This invention relates to a device to indicate the denomination of currency tendered a cashier in payment for merchandise to provide the cashier with a convenient indication of the denomination of the currency tendered whereby mistakes in making change are substantially reduced and particularly those wherein the mistake occurs by reason of the cashier's forgetting the particular denomination of the currency tendered after the currency has been placed in the cash drawer or register.

The principal object of the invention is the provision of a device to indicate the denomination of currency tendered a cashier.

A further object of the invention is the provision of a device to indicate the denomination of currency tendered a cashier and which device may be simply and easily actuated by the cashier both with respect to establishing the indication of the particular denomination of currency tendered and in clearing the indicator after the need for the same has passed.

A still further object of the invention is the provision of a device for indicating the denomination of currency tendered a cashier and wherein simple, easily formed mechanical means is utilized which includes indicator portions which may be illuminated if desired.

The currency denomination indicator disclosed herein comprises a new article of manufacture which may be formed as a relatively small self-contained unit for placement adjacent a cash drawer or cash register in a retail establishment where it may be advantageously used by the cashier in providing a temporary indication of a denomination of currency tendered by a customer or it may be conceivably incorporated in a cash register, adding machines and cash register combination or the like. In either form the device of the invention provides means whereby the particular denomination of currency offered a cashier may be temporarily indicated and subsequently cleared and thereby serves as a precautionary element enabling the cashier to be certain of the denomination of the currency tendered and therefore be certain of the correct change, if any, to be given a customer.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a plan view of the currency denomination indicator.

Figure 2 is a side view with parts broken away and parts in cross section.

Figure 3 is a vertical section taken on line 3—3 of Figure 2.

Figure 4 is a bottom view of the top portion of the device illustrated in Figure 1.

Figure 5 is a vertical section taken on line 5—5 of Figure 1. Section lines 4—4 indicate the view in Figure 4.

Figure 6 is a vertical section taken on line 6—6 of Figure 4, the section being illustrated in perspective.

By referring to the drawings and Figures 1 and 2 in particular it will be seen that the currency denomination indicator comprises a compact generally rectangular housing 10, the top portion 11 of which is inclined longitudinally thereof as best shown in Figure 2. The top portion 11 includes a plurality of oppositely disposed spaced pairs of openings 12—12 and 13—13. The plurality of openings 12—12 are formed on a common longitudinal line adjacent one side of the device and the openings 13—13 are formed on a common longitudinally extending line adjacent the other side of the device. Each of the openings 12—12 has a corresponding sidewardly spaced opening 13. Each of the openings 12 has a vertically movable key 14 positioned therein which is normally elevated with respect to the top 10 and capable of being manually depressed. Each of the keys 14 carries a different indicia; for example, the dollar sign and the numeral 1. As illustrated in Figure 1 of the drawings eight of the openings 12 are provided and eight keys 14 are positioned therein, the eight keys carrying the following indicia: $1, $2, $3, $4, $5, $10, $20 and $50. The keys are preferably similar in design and indicia to those commonly used on a cash register.

A plurality of buttons 15—15 formed of light transmitting material are positioned one in each of the openings 13—13 heretofore described and each of the buttons has an opaque top portion 16. The buttons 15 are normally positioned in the openings 13 with the top 16 thereof flush with the top 11 of the device. Indicia corresponding with the indicia on the keys 14 is formed on the top 11 adjacent the openings 13. For example, the opening 13 at the right hand end of the device, as disclosed in Figure 1 of the drawings, has the numeral 1 positioned on the top 11 immediately adjacent thereto and this corresponds with the $1 indicia on the key 14 nearest the right hand end of the device and the key 14 and the button 15 adjacent the right hand end form one of the oppositely disposed pairs of openings 12 and 13 as heretofore described. Each of the openings 13—13 has a numeral located adjacent thereto on the top portion 11 of the device and corresponds with the oppositely disposed key 14. Thus the key 14 having the $5 indicia thereon lies directly opposite the opening 13 having the numeral 5 adjacent thereto on the top portion 11.

Means in the device interconnects the key 14 having the indicia $1 thereon and the button 15 positioned adjacent the indicia 1 so that when the key bearing the indicia $1 is depressed, the button adjacent the indicia 1 is elevated so that the light conducting body portion thereof is visible above the top portion 11 of the device. This is best illustrated in Figure 5 of the drawings which comprises a vertical section taken on line 5—5 of Figure 1 through the key 14 and button 15 heretofore referred to.

A light source is located in the housing 10 as best shown in Figures 2, 3 and 5 of the drawings. A white incandescent bulb 17 is positioned in the housing 10 in the right half thereof and a red colored incandescent bulb 18 is positioned in the housing in the left portion thereof. A divided partition 19 localizes the colored lights 17 and 18 so that the buttons 15 adjacent the numerals 1, 2, 3 and 4 on the right half of the device, as shown in Figures 1 and 2 of the drawings, will show white illumination when they project above the top portion 11 of the device and the buttons adjacent the numerals 5, 10, 20 and 50 in the left half of the device, as shown in Figures 1 and 2, will show red illumination when they project above the top portion 11 of the device.

By referring now to Figures 4 and 5 of the drawings it will be seen that the lower portions of each of the buttons 15 depend below the top portion 11 and into the area within the housing 10. Coil springs 20 are positioned about the depending portions of the buttons 15 as the same have an enlarged end section against which the springs 20 register. The enlarged end sections are slotted transversely as at 21 for registry with the ends of a plurality of levers 22 which in turn are pivoted on a longitudinally extending shaft 23. The shaft 23 is suspended from the top portion 11 by brackets 24 and the other end of the levers 22 are pivoted as at 25 to the depending ends of the keys 14.

It will be observed by referring to Figure 4 of the drawings that each of the keys 14 has a corresponding lever 22 pivoted thereto and also pivoted on the longitudinally extending shaft 23 so that downward movement imparted one of the keys 14 will move the lever 22 and cause the opposite end thereof to elevate one of the buttons 15 thereby compressing the spring 20 positioned about the button and providing energy sufficient to return the device to normal position after each operation.

In order that the button 15 will remain in upright position projecting above the top portion 11 of the device so that the light transmitted through the transparent body of the button 15 may be seen, latch means is provided and may best be seen in Figures 4 and 5 of the drawings. The latch means comprises a plurality of V-shaped springs 26 each of which is secured to the under side of the top portion 11 by a fastener 27 and each of which has one end outturned and engaged in an opening 28. The other end of each of the springs 26 is passed through an opening in one of a plurality of secondary levers 29 which are attached at their lowermost ends to a rock shaft 30. This is best illustrated in Figures 3, 4 and 6 of the drawings. By referring thereto it will be observed that the rock shaft 30 is positioned on a pair of brackets 31 which are also affixed to the top portion 11 as best shown in Figure 4 of the drawings.

The rock shaft 30 comprises release means for moving the springs 26 with respect to the keys 14 and in particular with respect to transverse notches 32 therein. A release button 33 is provided on the extreme right end of the device and the lower portion thereof is in engagement with a cam 34 connected to the rock shaft 30 so that downward movement of the release button 33 moves the cam 34 and partially rotates the rock shaft 30. This action in turn moves the plurality of depending levers 29 and they in turn move the springs 26 away from the notches 32 and the keys 14 and thereby permit the springs 20 to depress the buttons 15 and elevate the keys 14.

It will thus be seen that the device provides a convenient and easily operated group of indicators arranged to indicate the denomination of currency tendered a cashier and that each of the indicating buttons 15 has a corresponding operating key 14 by means of which the same is actuated. The buttons will move vertically and provide a visual indication of their operation whether the lights 17 and 18 are illuminated or not. The illumination of the lights 17 and 18 provides additional signal in that in addition to the buttons 15 moving vertically to elevated position with respect to the top portion 11, they glow by reason of light transmitted from the bulbs 17 and 18. A switch 35 is provided on the side of the device so that the circuit normally supplying the bulbs 17 and 18 may be controlled. Circuit wires 36 provide means for connecting the device with a current supply.

It will thus be seen that a device meeting the several objects of the invention has been disclosed. It will also be seen that in operation the device is connected with a source of suitable current, the switch 35 moving to "on" position and the bulbs 17 and 18 thereby illuminated. The cashier being tendered a five dollar bill depresses the key 14 carrying the $5 indicia which causes a corresponding button 15 adjacent the numeral 5 on the top portion 11 to move to elevated position and the transparent light conducting quality of the button 15 causes the same to glow with a red light from the bulb 18. The cashier then proceeds to make change being certain of the denomination of the currency tendered. Upon completion of the transaction the release button 33 is depressed, the key 5 returns to upright position and the button 15 moves back into flush relation with the top portion 11. It will be observed that none of the other buttons will give any indication of light or movement and only the button corresponding with the depressed key will be elevated and due to the opaque top portion 16 of each of the buttons 15 no light will be visible through the buttons in flush position.

Having thus described my invention, what I claim is:

1. A currency denomination indicated comprising a body member having a plurality of notched keys and a plurality of signaling buttons mounted for vertical movement therein, the said notched keys and buttons arranged in oppositely disposed pairs, levers pivoted midway between their ends to the body member and engaging the key and button of each of the said pairs, said keys normally positioned in elevated relation to the said body member and said buttons normally positioned in flush relation with the said body member whereby downward movement of one of the said keys results in upward movement of one of the said buttons, means for retaining each of the keys in depressed position and its corresponding button in elevated position, said means comprising a plurality of springs each of which is registrable in one of the notched keys, a release button in said body member, a rock shaft movably engaged by said release button and means on said rock shaft for engaging the said springs to move them away from the said notched keys and spring means between said buttons and said body member normally urging the buttons into flush relation therewith, identifying indicia on each of the said keys and corresponding identifying indicia on said body member adjacent each of the corresponding buttons.

2. A currency denomination indicator comprising a body member having a plurality of notched keys and a plurality of signaling buttons for vertical movement therein, the said notched keys and buttons arranged in oppositely disposed pairs, levers pivoted to the body member and interconnecting the key and button of each of the said pairs, springs holding said keys in elevated relation to the said body member and said buttons in flush relation with the said body member whereby downward movement of one of the said keys results in upward movement of one of the said buttons, means for retaining each of the keys in depressed position and its corresponding button in elevated position, said means comprising a plurality of springs each of which is registrable in one of the notched keys, a release button in said body member, and manually movable apparatus subject in operation to the said release button for disengaging the said springs from the said notched keys, identifying indicia on each of the said keys and corresponding identifying indicia on said body member adjacent each of the corresponding buttons.

3. The currency denomination indicator set forth in claim 2 and further characterized by the formation of each of the said signaling buttons as a translucent light transmitting member, the uppermost end of which is opaque and wherein a light source is provided for illuminating the said buttons.

4. A currency denomination indicator comprising a hollow body member having an inclined top with spaced parallel rows of openings therein, a plurality of keys positioned in one of the rows of openings and a plurality of light transmitting buttons positioned in the other of the rows of openings, the tops of each of the buttons formed of opaque material, resilient means holding the said keys in elevated relation to the said top and the opaque tops of the buttons in flush relation with the said top, the said keys and buttons arranged in oppositely disposed pairs, a longitudinally extending pivot rod disposed in said hollow body member, a plurality of levers positioned transversely of said pivot rod, each of the levers engaging an oppositely disposed key and button whereby downward movement imparted one of the keys will result in upward movement of the corresponding button, light means in the said hollow body member for illuminating the said buttons and means for latching the said keys in depressed position and whereby the corresponding buttons are held in elevated position and a release button on the said body member for actuating the said latch means, identifying indicia on each of the said keys and corresponding identifying indicia on said top adjacent each of the corresponding buttons.

5. A currency denomination indicator comprising a hollow body member having a top panel with a plurality of oppositely disposed pairs of openings therein, operating keys and signaling buttons positioned in pairs in the said oppositely disposed openings and movable vertically with respect thereto, a longitudinally extending pivot member positioned beneath said top panel and a plurality of levers pivoted transversely thereof, each of the levers engaging one of the oppositely disposed keys and buttons, the keys including stem portions depending beneath the said top panel and having notches therein, V-shaped springs mounted on the under side of the said top panel and adjacent each of the said keys and registrable with the notch in the stem thereof when the said key is in depressed position with respect to the top panel, a rock shaft positioned longitudinally of the said top panel and therebeneath, a sideward extension on said rock shaft and a release button in said top panel engaging said sideward extension whereby the rock shaft may be partially rotated by depressing the said release button, a plurality of arms on said rock shaft, each of the arms engaged on one of the said V-shaped springs whereby movement of the rock shaft and the arms will move the springs to disengage the said keys and coil springs positioned around each of the said buttons and engaged against the bottom of the top panel for normally urging the buttons downwardly and the keys upwardly with respect thereto, identifying indicia on each of the said keys and corresponding identifying indicia on said top adjacent each of the corresponding buttons.

6. The currency denomination indicator set forth in claim 5 and further characterized by the inclusion of at least two different colored lights in the said hollow body member and wherein the signaling buttons are formed of light transmitting material and the tops of the buttons are opaque.

EDGAR G. SMITH.

REFERENCES CITED

The following references are of record in the file of this patent:

UNITED STATES PATENTS

| Number | Name | Date |
|---|---|---|
| 593,528 | Laure et al. | Nov. 9, 1897 |
| 2,265,124 | Andres | Dec. 9, 1941 |
| 2,338,757 | Curran | Jan. 11, 1944 |
| 2,437,555 | Rees | Mar. 9, 1948 |
| 2,440,063 | Andrews | Apr. 20, 1948 |
| 2,490,807 | Hodel et al. | Dec. 13, 1949 |